United States Patent [19]

Oguri et al.

[11] Patent Number: 4,505,866
[45] Date of Patent: Mar. 19, 1985

[54] PROCESS FOR PRODUCING A BOEHMITE SHAPED PRODUCT AND A BURNED BOEHMITE SHAPED PRODUCT

[75] Inventors: Yasuo Oguri, Tokyo; Junji Saito, Yokohama; Naoto Kijima, Machida, all of Japan

[73] Assignee: Mitsubishi Chemical Industries, Limited, Tokyo, Japan

[21] Appl. No.: 466,576

[22] Filed: Feb. 15, 1983

[30] Foreign Application Priority Data

Feb. 23, 1982 [JP] Japan ................................. 57-28008
Oct. 29, 1982 [JP] Japan ................................ 57-190074

[51] Int. Cl.³ .............................................. C04B 35/52
[52] U.S. Cl. ..................................... 264/42; 264/82; 264/86; 264/333
[58] Field of Search .................... 501/127; 264/42, 82, 264/86, 333

[56] References Cited

U.S. PATENT DOCUMENTS

| | | | |
|---|---|---|---|
| 3,223,537 | 12/1965 | Wiegert | 264/42 |
| 3,284,218 | 11/1966 | King | 501/127 |
| 3,795,724 | 3/1974 | Paul | 501/127 |
| 4,019,914 | 4/1977 | Esper | 501/127 |
| 4,028,122 | 6/1977 | Greenwald | 501/127 |

Primary Examiner—John A. Parrish
Attorney, Agent, or Firm—Oblon, Fisher, Spivak, McClelland & Maier

[57] ABSTRACT

A process for producing a boehmite shaped product comprises slurrying a mixture of a gibbsite powder and at least one powder selected from the group consisting of powders of pseudo-boehmite, amorphous aluminum hydroxide, alumina cement and ρ-alumina, molding the slurry thereby obtained and subjecting the molded product to hydrothermal treatment.

10 Claims, 3 Drawing Figures

PROCESS FOR PRODUCING A BOEHMITE SHAPED PRODUCT AND A BURNED BOEHMITE SHAPED PRODUCT

The present invention relates to a process for producing a beohmite shaped product and a burned shaped product thereof. More particularly, the present invention relates to a process for producing a boehmite shaped product and a burned shaped product thereof which have high strength and low bulk density and which are useful, for instance, as heat insulating materials.

A shaped product of boehmite ($Al_2O_3 \cdot H_2O$) can be readily obtained, for instance, by molding a powder of gibbsite ($Al_2O_3 \cdot 3H_2O$) with a binder and subjecting the molded product to hydrothermal treatment. Further, if this shaped product is burned at a high temperature, the boehmite will undergo structural phase transformation to form aluminas having various structures, such as $\alpha$-alumina.

However, heretofore, such a boehmite shaped product has scarcely been used as a precursor of a heat insulating material or an $\alpha$-alumina-type heat insulator. This is attributable to the fact that a boehmite shaped product having high strength has not been obtainable.

According, it is an object of the present invention to provide a process for producing a boehmite shaped product and burned boehmite shaped product having high strength.

Another object of the present invention is to provide a process for producing a boehmite shaped product and burned boehmite shaped product having a low bulk density.

A further object of the present invention is to provide a process for producing a boehmite shaped product and burned boehmite shaped product having low thermal conductivity throughout a wide temperature range.

Namely, the present invention provides a process for producing a boehmite shaped product which comprises slurrying a mixture of a gibbsite powder and at least one powder selected from the group consisting of powders of pseudo-boehmite, amorphous aluminum hydroxide, alumina cement and $\rho$-alumina, molding the slurry thereby obtained and subjecting the molded product to hydrothermal treatment. The hyrothermally treated boehmite shaped product may further be burned to obtain a burned boehmite shaped product. The boehmite shaped product and burned boehmite shaped product obtained by the process of the present invention are useful as heat insulating materials.

Now, the present invention will be described in detail with reference to the preferred embodiments.

In the present invention, a mixture of a gibbsite powder and at least one powder selected from the group consisting of powders of pseudo-boehmite, amorphous aluminum hydroxide, alumina cement and $\rho$-alumina, is used as a starting material. These starting materials are usually pulverized into powder having a particle size of from 0.1 to 500 μm.

The mixture of the starting materials usually comprises from 5 to 99 parts by weight, preferably from 50 to 99 parts by weight, of the gibbsite powder and from 1 to 95 parts by weight, preferably from 1 to 50 parts by weight, of at least one of the above-mentioned other powders.

As one of the above-mentioned other powders, it is preferred to always use alumina cement since alumina cement serves also as a binder. Further, the pseudo-boehmite or the amorphous aluminum hydroxide may used in the form of a sol.

A proper amount of water is added to the mixture of the starting materials to form a slurry, and the slurry is then molded. The amount of water is usually optionally selected within the range of from 1 to 300 parts by weight per 100 parts by weight of the mixture of the starting materials, taking into accounts the bulk density of the desired boehmite shaped product. The molding can be conducted in accordance with a conventional method e.g. by means of a compression molding machine. Further, it is possible that the slurry is poured into a mold and the entire mold is subjected to hydrothermal treatment.

The hydrothermal treatment is usually conducted at a temperature of from 100° to 400° C., preferably from 150° to 300° C. under pressure of from 2 to 1000 kg/cm²G, preferably from 5 to 100 kg/cm² G for from 0.1 to 100 hours, preferably from 1 to 5 hours.

The boehmite shaped product obtained by the hydrothermal treatment according to the present invention is then subjected to drying treatment at a temperature of from 50° to 200° C. for from 5 to 100 hours before it is used as a heat insulating material or as a precursor for a burned boehmite shaped product which will be described hereinafter.

On the other hand, in order to obtain a light weight boehmite shaped product having a low bulk density, it is necessary to use a foamed molded product as the molded product prior to the hydrothermal treatment. A foamed molded product may be obtained by a method in which a proper foaming agent is incorporated in the slurry of the starting materials and then the slurry is molded and subjected to foaming treatment. However, it may usually be obtained by a method wherein a foamed slurry is used as the starting slurry for molding. A foamed slurry may be prepared, for instance, by adding to the above-mentioned slurry a thickener and, if necessary, a surfactant or a binder and stirring the mixture to generate bubbles, or by admixing a thickener and water and, if necessary, a surfactant to form bubbles, adding to the bubbles the mixture of the starting materials and, if necessary, a binder and stirring the mixture.

The amount of the foams is determined depending upon the bulk density of the desired beohmite shaped product. Usually, however, the amount is adjusted so that the ratio of the foam volume (i.e. the difference in volume of the foamed slurry from the slurry containing no foams) to the volume of the foamed slurry (foam volume %) is from 1 to 95% by volume.

For instance, in order to obtain a boehmite shaped product having a bulk density of from 0.1 to 1.0, the foam volume % is selected within the range of from 5 to 99% by volume, preferably from 20 to 80% by volume.

Usually, the foaming treatment is conducted within a temperature range from 0° to 100° C. For this treatment, a mixing machine equipped with a stirrer such as a vane-shaped, blade-shaped or turbine-type stirrer may be used. The rotational speed and the stirring time are determined depending upon the type of the stirrer, the viscosity of the material to be treated and the desired diameter of the foams. In the present invention, it is preferred to adjust the rotational speed to be from 50 to 5000 r.p.m. and the stirring time to be from 1 min. to 5 hours in order to obtain foams having a diameter of at most 2 mmφ, preferably at most 0.5 mmφ.

As the thickener, various types of the conventional thickeners may be used. However, polyvinyl alcohol is particularly preferred since it is thereby possible to improve the strength of the shaped product after the hydrothermal treatment.

The amount of the thickener to be used may vary depending upon the viscosity thereof. However, it is usually selected within the range of from 0.01 to 50 parts by weight, preferably from 0.1 to 20 parts by weight, per 100 parts by weight of the mixture of the starting materials.

To facilitate the formation of the foams, it is preferred to use a surfactant. However, such a surfactant must be properly selected as the nature of the slurry differs depending upon the kind of the starting mixture and the thickener. Specifically, when the slurry is alkaline, an anionic surfactant such as an alkylcarboxylic salt or an alkylsulfonic salt or a nonionic surfactant such as polyethylene glycol or a fatty acid ester of a polyvalent alcohol may preferably be used, and when the mixture of the starting materials are acidic, a cationic surfactant such as a higher amine salt or a higher alkyl quaternary ammonium salt or a nonionic surfactant as mentioned above may preferably be used.

The amount of the surfactant is usually selected within the range of from 1 to 50,000 ppm, preferably from 10 to 10,000 ppm based on the water used. If the amount is too small, no adequate effectiveness to facilitate the formation of the foams is obtainable. On the other hand, if the amount is too great, it becomes difficult to obtain fine uniform foams.

The stability of the foams formed by the stirring varies depending upon the kind of the mixture of the starting materials. When the formed foams are breakable, it is preferred to use a binder to stabilize the foams.

As such a binder, there may be used various kinds of conventional binders. However, portland cement, magnesia cement or gypsum is particularly preferred.

The amount of the binder is usually selected within the range of from 0.1 to 100 parts by weight, preferably from 1 to 20 parts by weight, per 100 parts by weight of the mixture of the starting materials.

The amount of water to be used is selected within the above-mentioned range taking into accounts the stability of the foams during the hydrothermal treatment. For instance, in order to obtain a boehmite shaped product having a bulk density of from 0.1 to 1, the amount of water is optionally selected within the range of from 1 to 300 parts by weight, preferably from 5 to 200 parts by weight, per 100 parts by weight of the mixture of the starting materials.

Then, after the foamed slurry has been solidified in the mold, it is subjected to hydrothermal treatment as it is placed in the mold or after it is taken out of the mold, whereby boehmite crystals are precipitated from the boehmite-forming compounds. This hydrothermal treatment is conducted under the aforementioned conditions.

The boehmite shaped product having a low bulk density thus obtained according to the present invention is subjected to drying treatment in the same manner as mentioned above and then it may be used as a heat insulating material or as a precursor for a burned boehmite shaped product.

The burned boehmite shaped product of the present invention may readily be obtained by burning the boehmite shaped product obtained by the above-mentioned process, at a high temperature in accordance with the conventional method.

Namely, at a burning temperature of about 500° C. a $\gamma$-alumina shaped product is obtainable by the dehydration of the crystal water. Further, at a temperature of about 800° C., a $\delta$-alumina shaped product is obtainable, and likewise at a temperature of 1000° C., a $\theta$-alumina shaped product is obtainable. Still further, by the burning at a temperature of from about 1200° to about 2000° C. for from 10 min. to 24 hours, an $\alpha$-alumina shaped product is obtainable.

Thus, the shaped product of the intermediate alumina ($\gamma$, $\delta$, $\theta$) undergoes no substantial thermal shrinkage due to the structural phase transformation and they can advantageously be used as heat insulating materials for use at a high temperature.

Further, the process for producing an $\alpha$-alumina shaped product according to the present invention has the following advantages. Namely, as is well-known, a shaped product having fine pores exhibits good heat insulating effectiveness. Especially, the thermal conduction of the light weight porous shaped product at a high temperature is mainly attributable to the radiation and accordingly it is desirable that a refractory heat insulating material to be used at a high temperature is made to have fine pores. In the conventional process for producing an $\alpha$-alumina heat insulating material, an $\alpha$-alumina powder is molded with a binder and then burned, and it has been attempted to obtain a light weight porous shaped product by adding a flammable material or a foaming agent. However, the $\alpha$-alumina powder used as the starting material usually has a relatively large particle size and it is thereby difficult to obtain a shaped product having fine pores. On the other hand, it is time and labour consuming to pulverize the $\alpha$-alumina powder into fine particles, and the fine powder thus obtained will be expensive.

In the case where a flammable material or a foaming agent is added to the $\alpha$-alumina powder to produce a light weight product, it is common to sue an organic binder for the purpose of improving strength at a low temperature. However, after the organic binder is burned in the burning step, the strength of the shaped product is relatively small until the $\alpha$-alumina is sintered at a temperature above 1200° C. This brings about difficulties in the practical operation of the process. In order to overcome the difficulties, it has been proposed to increase the strength by using an inorganic binder such as alumina sol or silica sol or by incorporating alumina cement. However, in the former case, even when the inorganic binder is gelled in the burning step, no substantial effectiveness to improve the strength of the light weight shaped product is obtainable within a temperature range of not higher than 1200° C. In the latter case, there is a disadvantage that the CaO content detrimental to heat resistance will thereby be increased.

Thus, it used to be difficult to produce an $\alpha$-alumina shaped product having a low bulk density with a number of fine pores and yet high strength. Whereas, according to the process of the present invention, an $\alpha$-alumina shaped product having such superior physical properties can readily be prepared at a low production cost.

The reason why the boehmite shaped product obtained by the process of the present invention has such high strength is not clearly understood. It is considered, however, that such superior strength is attributable to the special crystal structure.

In the companying drawings, FIG. 1 (a) is a photograph of a free fracture surface of the boehmite shaped product obtained by Example 1 as taken by a scanning electron microscope (3000 magnifications).

Figure 1A:
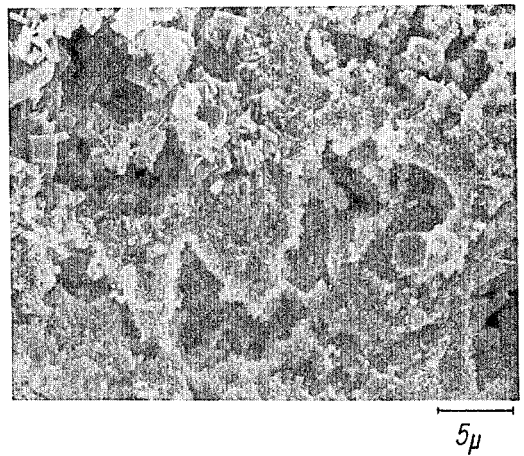
FIG. 1 (b) is a similar photograph of a free fracture surface of the shaped product obtained by Comparative Example 1.
Figure 1B:
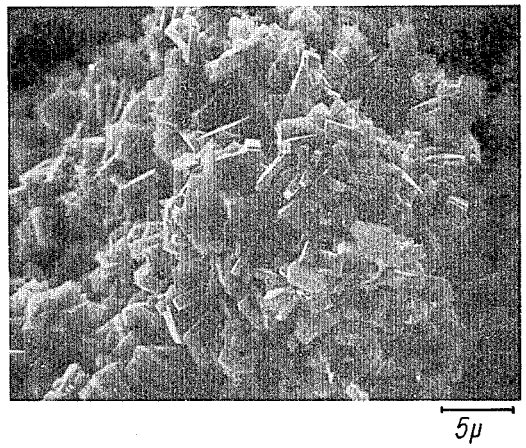

From the comparison of the photographs of FIG. 1 (a) and (b), it is evident that the boehmite shaped product (FIG. 1 (a)) obtained by the process of the present invention has a special structure such that spaces between coarse grains are filled with smaller grains.

Further, when heat resistant particles having a radiation enery absorptivity of at least 35% throughout the entire wave-length range of from about 2 to about 5 μm, as measured by a 0.1 wt. % KBr disk method, are added to the slurry of the starting materials, the increase of the thermal conductivity of the boehmite shaped product or the burned shaped product thereof at a high temperature can thereby be suppressed and good results are thereby obtainable.

Namely, in general, the thermal conductivity of a shaped product changes with an increase of the temperature. For instance, the thermal conductivity of a low bulk density shaped product is relatively small at a low temperature but rapidly increases as the temperature rises. This phenomenon is attributable to the radiation thermal conduction which is predominant in the thermal conduction of the low bulk density shaped product and which increases in proportion to the fourth power of the temperature. This means that when the boehmite shaped product or the burned shaped product thereof is used as a heat insulating material, there is a certain bulk density for every practical temperature range where the thermal conductivity becomes to be minimum. However, it is not economical that the shaped product having a certain bulk density can be effectively used only within an extremely limited temperature range.

On the other hand, as represented by the following equation known as Wien's principle, the wave-length λmax at which the radiation energy is at the maximum level tends to be greater with an increase of the temperature.

$$\lambda_{max.} \times T = 0.002898 \text{ (mK)}$$

From the above equation, it is seen that a radiation energy of about 5 μm corresponds to a temperature of about 300° C. and a radiation energy of about 2 μm corresponds to a high temperature of at least about 900° C.

Figure 2:
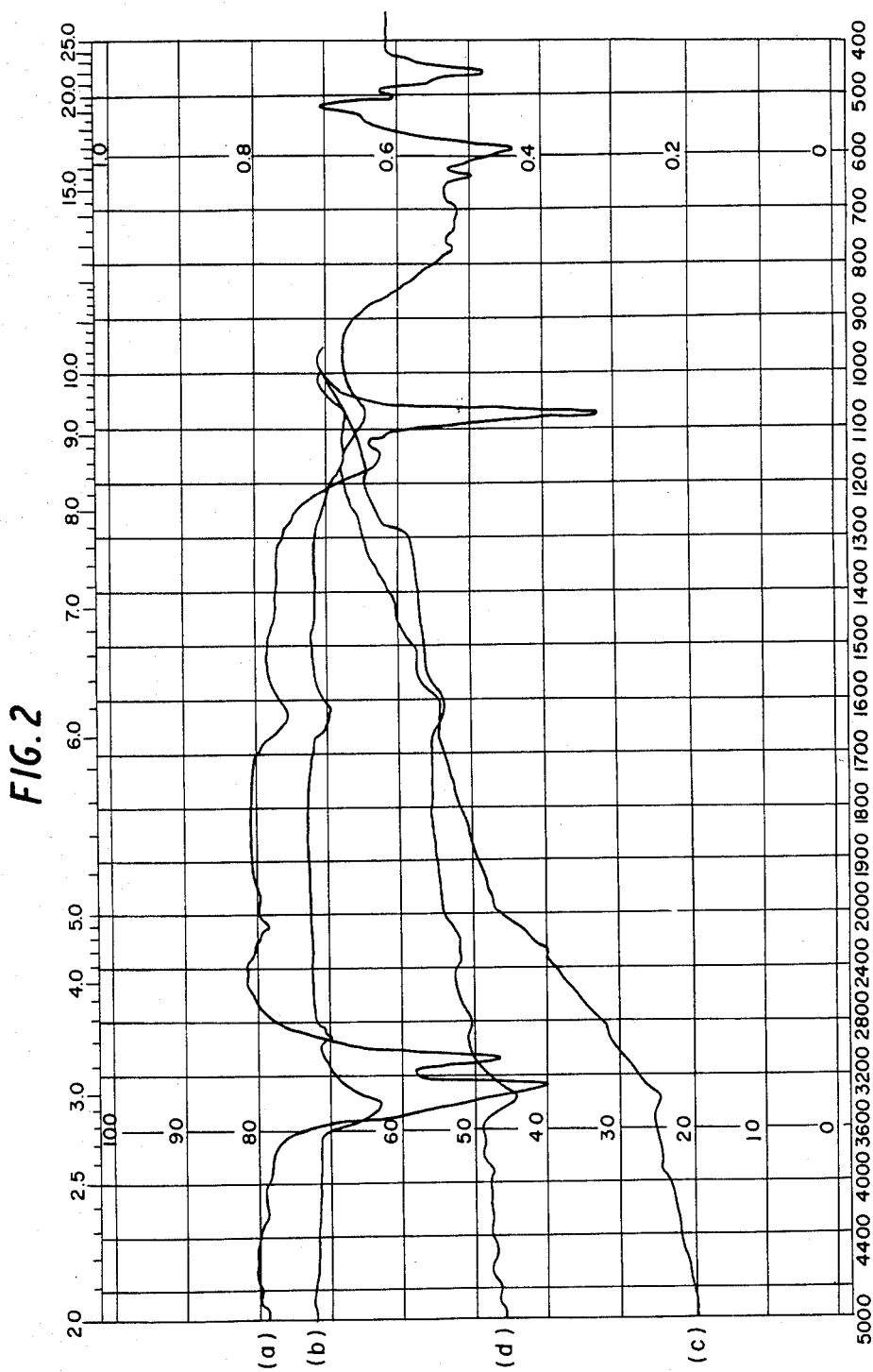
FIG. 2 illustrates infrared absorption spectra of boehmite and alumina (α-alumina) as measured by a 0.1 wt. % KBr disk method.

Referring to FIG. 2, (a) is an infrared absorption spectrum of boehmite as measured by a 0.1 wt. % KBr disk method, and (b) is a similar spectrum of alumina (α-alumina). As shown in the Figure, the absorptivity of the boehmite or burned shaped product thereof at from 2 to 5 μm is about 30% at the maximum.

Accordingly, the boehmite shaped product or the burned shape product thereof containing the above-mentioned heat resistant particles having a radiation energy absorptivity of at least 35% is capable of absorbing a radiation energy and has a low thermal conductivity over a wide temperature range, and thus it is particularly superior as a heat insulating material for use at a high temperature.

The heat resistant particles are usually required to have adequate heat resistance against a temperature of at least 500° C., preferablyat least 800° C. As specific example of such heat resistant particles, there may be mentioned carbides such as silicon carbide, boron carbide, titanium carbide, tungsten carbide or molybdenum carbide and oxide such as ilmenite, titanium oxide, iron oxide or manganese oxide.

In FIG. 2, (c) and (d) represent infrared absorption spectrum of silicon carbide and ilmenite, respectively, as measured by a 0.1 wt. % KBr disk method. It is evident from these spectra that these compounds act as radiation energy absorbing agents.

The heat resistant particles usually have an average particle size of not more than 50 μm, preferably from 0.5 to 30 μm, more preferably from 1 to 10 μm.

The amount of the heat resistant particles is selected within the range of from 0.5 to 20 parts by weight, preferably from 1 to 10 parts by weight, per 100 parts by weight of the shaped product. If the amount is excessive, the thermal conductivity of the product will increase as the heat resistant particles have a great thermal conductivity. On the other hand, if the amount is too small, no adequate effectiveness to reduce the thermal conductivity can be expected.

Now, the present invention will be described in further detail with reference to Examples. Examples 1 to 7 illustrate the production of boehmite shaped products and Examples 8 to 13 illustrate the production of burned boehmite shaped product. In the Examples, "parts" means "parts by weight". Further, gibbsite as a main starting material had a $Al_2O_3$ content of 65% and the average particle size thereof was about 50 μm unless otherwise specifically indicated.

EXAMPLE 1

To 100 parts of gibbsite; 1 part of amorphous aluminum hydroxide (containing 60% of $Al_2O_3$) and 26 parts of water were mixed, and the mixture was kneaded for 20 minutes by a kneader. The slurry thereby obtained was poured into a stainless steel mold. The mold was placed in an autoclave and subjected to hydrothermal treatment at a temperature of 200° C. under pressure of 15 kg/cm$^2$G for 4 hours and then dried at 100° C. for 24 hours, whereby a boehmite shaped product was obtained.

The specific gravity, the compression strength and the specific strength of the boehmite shaped product thereby obtained are shown in Table 1.

It was confirmed by an X-ray diffractiometry of the powder that the shape product was composed of pure boehmite crystals having good crystalinity.

Further, from the observation of the free fracture surface of the shaped product by a scanning electron microscopic photograph, it was found that spaces between coarse grains were filled with smaller grains.

EXAMPLE 2

To 100 parts of gibbsite, 1 part of amorphous aluminum hydroxide (containing 60% of $Al_2O_3$) and 9 parts of water, and the mixture was kneaded for 20 minutes by a kneader. The slurry thereby obtained was molded by a press-molding machine under pressure of 100 kg/cm$^2$. Then, the molded product was placed in an autoclave and subjected to hydrothermal treatment at a temperature of 200° C. under pressure of 15 kg/cm$^2$G. for 4 hours and then dried at 100° C. for 24 hours, whereby a boehmite shaped product was obtained.

The results thereby obtained are shown in Table 1.

EXAMPLE 3

A boehmite shaped product was obtained in the same manner as in Example 1 except that a slurry composed of 100 parts of gibbsite, 10 parts of alumina cement (containing 52% of $Al_2O_3$) and 40 parts of water was used. The results thereby obtained are shown in Table 1.

The thermal conductivity of this shaped product at 400° C. was 0.28 kcal/m.h.° C.

EXAMPLE 4

A boehmite shaped product was obtained in the same manner as in Example 1 except that a slurry composed of 100 parts of gibbsite, 1 part of pseudo-boehmite (containing 62% of $Al_2O_3$) and 40 parts of water was used. The results thereby obtained are shown in Table 1.

EXAMPLE 5

A boehmite shaped product was obtained in the same manner as in Example 1 except that a slurry composed of 100 parts of gibbsite, 10 parts of alumina cement (containing 52% of $Al_2O_3$), 5 parts of silicon carbide having an average particle size of 3 $\mu$m and 40 parts of water was used. The results thereby obtained are shown in Table 1.

The thermal conductivity of this shaped product at 400° C. was 0.22 kcal/m.h.° C.

EXAMPLE 6

Into a mixer, 1234 g of gibbsite having an average particle size of 1 $\mu$m, 343 g of $\rho$-alumina having an average particle size of 12 $\mu$m, 86 g of alumina cement, 2000 g of an aqueous solution containing 10% of polyvinyl alcohol and 10 g of sodium alkylsulfate were introduced and stirred at a rotational speed of 600 r.p.m. at room temperature, whereby 6200 cc (foam volume of 3500 cc) of a foamed slurry was obtained.

This foamed slurry was poured into a mold, then left for 18 hours at room temperature and taken out from the mold, whereby a shaped product of 30×30×6.9 cm was obtained.

This shaped product was placed in an autoclave, subjected to hydrothermal treatment at a temperature of 200° C. under pressure of 15 kg/cm$^2$G for 4 hours and then dried at 100° C. for 24 hours, whereby a boehmite shaped product was obtained. The results thereby obtained are shown in Table 1.

EXAMPLE 7

Into a mixer, 2000 g of an aqueous solution containing 10% of polyvinyl alcohol and 10 g of sodium alkylsulfate were introduced and stirred at a rotational speed of 600 r.p.m. at room temperature to form a foam of 5500 cc. While continuing the stirring, 1234 g of gibbsite having an average particle size of 1 $\mu$m, 343 g of $\rho$-alumina having an average particle size of 12 $\mu$m and 86 g of alumina cement were added to obtain 6200 cc of a foamed slurry.

This foamed slurry was poured into a mold, left to stand at room temperature for 18 hours and then taken out from the mold, whereby a shaped product of 30×30×6.9 cm was obtained.

This shaped product was placed in an autoclave, subjected to hydrothermal treatment at a temperature of 200° C. under pressure of 15 kg/cm$^2$G for 4 hours and then dried at 100° C. for 24 hours, whereby a boehmite shaped product was obtained. The results thereby obtained are shown in Table 1.

COMPARATIVE EXAMPLE 1

A boehmite shaped product was prepared in the same manner as in Example 1 except that a slurry composed of 100 parts of gibbsite and 26 parts of water was used. The results thereby obtained are shown in Table 1.

When compared with the boehmite shaped product of Example 1, the shaped product of this Comparative Example has apparently less compression strength. From the observation of the structure of the free fracture surface of this shaped product by a scanning electron microscopic photograph, it was found that each grain has substantially the same size and the grains were weakly bonded to one another at extremely small portions.

The reason why the specific gravity is smaller than that of the boehmite shaped product of Example 1 is believed to be due to the fact that no smaller grains are packed in the spaces between the coarse grains.

COMPARATIVE EXAMPLE 2

A boehmite shaped product was obtained in the same manner as in Example 2 except that a slurry composed of 100 parts of gibbsite and 9 parts of water was used. The results thereby obtained are shown in Table 1.

COMPARATIVE EXAMPLE 3

To 100 parts of gibbsite, 30 parts of an aqueous solution containing 1% by weight of methylcellulose was mixed and the mixture was kneaded for 20 minutes by a kneader. The slurry thereby obtained was poured into a stainless steel mold. The mold was placed in an autoclave, subjected to hydrothermal treatment at a temperature of 200° C. under pressure of 15 kg/cm$^2$G for 4 hours and then dried at 100° C. for 24 hours, whereby a boehmite shaped product was obtained. The result thereby obtained are shown in Table 1.

This shaped product had extremely small compression strength and it was found that even when an organic binder such as methylcellulose was used as a thickening binder, it was impossible to firmly bind the boehmite crystal grains to one another. The compression strength was smaller than that of the shaped product of Comparative Example 1 where methylcellulose was not incorporated. This indicates that although the methylcellulose serves as a thickening binder at a normal temperature, it does not serve as a thickening binder in the boehmite shaped product or it adversely suppresses the bonding of the boehmite crystal grains to one another.

COMPARATIVE EXAMPLE 4

A boehmite shaped product was obtained in the same manner as in Example 1 except that a slurry composed of 100 parts of gibbsite having an average particle size of 50 $\mu$m, 10 parts of gibbsite having an average particle size of 1 $\mu$m and 33 parts of water was used. The results thereby obtained are shown in Table 1.

From the observation of the structure of a free fracture surface of the shaped product by a scanning electron microscopic photograph, it was found that the structure was similar to the structure of the boehmite shaped product of Comparative Example 1.

COMPARATIVE EXAMPLE 5

Into a mixer, 1234 g of gibbsite having an average particle size of 1 μm, 80 g of a melamine resin, 12 g of paratoluenesulfonic acid, 2000 g of an aqueous solution containing 10% of polyvinyl alcohol and 10 g of sodium dodecylbenzenesulfonate were introduced and stirred at a rotational speed of 600 r.p.m. at room temperature, whereby 4900 cc of a foamed slurry was obtained.

This foamed slurry was poured into a mold, left to stand still at room temperature for 18 hours and then taken out from the mold, whereby a shaped product of 30×30×5.4 cm was obtained.

This shaped product was placed in an autoclave, subjected to hydrothermal treatment at a temperature of 200° C. under pressure of 15 kg/cm²G for 4 hours and then dried at 100° C. for 24 hours, whereby a boehmite shaped product was obtained.

The bulk density of the shaped product thereby obtained was 0.25. Further, the compression strength was 2.2 kg/cm² and the bending strength was 2.9 kg/cm².

TABLE 1

|  | Bulk density | Compression strength (kg/cm²) | Specific strength (kg/cm²) |
| --- | --- | --- | --- |
| Example 1 | 1.16 | 248 | 214 |
| Example 2 | 1.16 | 214 | 184 |
| Example 3 | 1.00 | 201 | 201 |
| Example 4 | 1.10 | 200 | 182 |
| Example 5 | 1.00 | 200 | 200 |
| Example 6 | 0.25 | 9.1 | 36.4 |
| Example 7 | 0.25 | 8.9 | 35.6 |
| Comparative Example 1 | 1.07 | 39.6 | 37.0 |
| Comparative Example 2 | 1.02 | 65.8 | 64.5 |
| Comparative Example 3 | 0.94 | 15.5 | 16.5 |
| Comparative Example 4 | 1.00 | 43.0 | 43.0 |
| Comparative Example 5 | 0.25 | 2.2 | 8.8 |

EXAMPLES 8 to 10

The boehmite shaped product obtained by Examples 1 to 3 were respectively burned at 650° C. for 8 hours, whereby burned boehmite shaped products (γ-alumina) were obtained. No shrinkage of the shaped products by the burning was observed. The physical properties of the shaped product thereby obtained are shown in Table 2.

COMPARATIVE EXAMPLE 6

The boehmite shaped product obtained by Comparative Example 1 was burned at 650° C. for 8 hours, whereby a burned boehmite shaped product (γ-alumina) was obtained. The compression strength was extremely reduced by the burning. The results are shown in Table 2.

COMPARATIVE EXAMPLE 7

To 100 parts of gibbsite, 1 part of amorphous alumina hydroxide and 26 parts of water were mixed, and the mixture was kneaded for 20 minutes by a kneader to obtain a slurry. The slurry was poured into a stainless steel mold and dried at 100° C. for 24 hours. The molded product was taken out from the mold and burned at 650° C. for 8 hours, whereby a burned boehmite shaped product (χ-alumina) was obtained. After the burning, the shaped product scarcely maintained its shape but was very fragile and it was impossible to measure the strength. Further, when the hydrothermal treatment was omitted, the strength was extremely reduced. The results are shown in Table 2.

COMPARATIVE EXAMPLE 8

To 100 parts of gibbsite, 1 part of amorphous alumina hydroxide and 9 parts of water were mixed and the mixture was kneaded for 20 minutes by a kneader. The kneader mixture was molded by a press-molding machine under a pressure of 100 kg/cm². The molded product was dried at 100° C. for 24 hours and then burned at 650° C. for 8 hours, whereby a burned boehmite shaped product (χ-alumina) was obtained.

This shaped product had extremely small compression strength despite the fact that the specific gravity was great. The results are shown in Table 2.

COMPARATIVE EXAMPLE 9

The boehmite shaped product obtained by a Comparative Example 3 was burned at 650° C. for 8 hours, whereby a burned boehmite shaped product (γ-alumina) was obtained. The compression strength of this product was extremely small. The results are shown in Table 2.

TABLE 2

|  | Bulk density | Compression strength (kg/cm²) | Specific strength (kg/cm²) |
| --- | --- | --- | --- |
| Example 8 | 0.95 | 174 | 183 |
| Example 9 | 0.96 | 126 | 132 |
| Example 10 | 0.81 | 141 | 174 |
| Comparative Example 6 | 0.86 | 10.9 | 12.7 |
| Comparative Example 7 | The strength was too low to conduct the measurements | | |
| Comparative Example 8 | 1.12 | 18.8 | 16.8 |
| Comparative Example 9 | 0.72 | 1.4 | 1.9 |

EXAMPLE 11

The boehmite shaped product obtained by Example 6 was burned at 1100° C. for 8 hours whereby a burned boehmite shaped product having a bulk density of 0.20 (δ-alumina) was obtained. The shaped product thereby obtained had a compression strength of 6.7 kg/cm² and a bending strength of 8.2 kg/cm².

The thermal shrinkage of the burned shaped product was less than 0.5% and the thermal conductivity at 700° C. and 1000° C. was 0.17 kcal/m·h·°C. and 0.26 kcal/m·h·°C., respectively.

As is apparent from these results, the boehmite shaped product obtained by Example 6 does not substantially undergo thermal shrinkage upto the temperature of about 1100° C. and the increase of the thermal conductivity of the burned shaped product is slight. Thus, it was found that the boehmite shaped product and the burned shaped product thereof are extremely useful as heat insulating materials.

EXAMPLE 12

The boehmite shaped product obtained by Example 6 was burned at 1450° C. for 2 hours, whereby a burned boehmite shaped product having a bulk density of 0.27 (a mixture of α-alumina and a trace amount of CaO·6Al₂O₃) was obtained.

This burned shaped product had a thermal conductivity of 0.15 kcal/m·h·°C., 0.19 kcal/m·h·°C. and 0.23 kcal/m·h·°C. at 700° C. 1000° C. and 1300° C., respectively.

As is apparent from these results, the burned shaped product of this Example has superior heat resistance and heat insulating property at a high temperature of about 1300° C.

EXAMPLE 13

Into a mixer, 1234 g of gibbsite having an average particle size of 1 μm, 343 g of ρ-alumina having an average particle size of 12 μm, 86 g of alumina cement, 62 g of silicon carbide having an average particle size of 3 μm, 2000 g of an aqueous solution containing 10% of polyvinyl alcohol and 10 g of sodium alkylsulfate were introduced and stirred at a rotational speed of 600 r.p.m. at room temperature, whereby 6600 cc (foam volume of 3,900 cc) of a foamed slurry was obtained.

This foamed slurry was poured into a mold, left to stand still at room temperature for 18 hours and taken out from the mold, whereby a molded product of 30×30×7.3 cm was obtained.

This molded product was placed in an autoclave, subjected to hydrothermal treatment at a temperature of 200° C. under pressure of 15 kg/cm²G for 4 hours and then dried at 100° C. for 24 hours, whereby a boehmite shaped product was obtained.

This shaped product was burned at 1100° C. for 8 hours, whereby a burned boehmite shaped product having a bulk density of 0.20 (δ-alumina) was obtained.

This burned shaped product had a thermal conductivity of 0.14 kcal/m·h·°C. and 0.18 kcal/m·h·°C. at 700° C. and 1000° C., respectively.

COMPARATIVE EXAMPLE 10

The boehmite shaped product obtained by Comparative Example 5 was burned at 1100° C. for 8 hours, whereby a burned boehmite shaped product having a bulk density of 0.21 (δ-alumina) was obtained.

The strength of this burned shaped product was too low to conduct the measurement of the strength.

We claim:

1. A process for producing a foamed boehmite shaped product which comprises:
    A. preparing a foamed slurry comprising:
        1. a gibbsite powder
        2. at least one additional powder selected from the group consisting of pseudo-boehmite, amorphous aluminum hydroxide, alumina cement and ρ-alumina,
        3. a thickener, and
        4. water;
    B. molding the foamed slurry thereby obtained and
    C. subjecting the foamed molded product to hydrothermal treatment.

2. The process of claim 1 wherein the foamed slurry is prepared by stirring the gibbsite powder, said additional powder, thickener and water into a mixture.

3. The process of claim 1 wherein the foamed slurry is prepared by first stirring the thickener and water to generate bubbles, and then adding thereto a mixture comprising the gibbsite powder and said additional powder and further stirring the total mixture.

4. The process of claim 1 wherein the slurry comprises heat-resistant particles having a radiation energy absorptivity of at least 35% throughout the entire range of the wave-length of from about 2 to about 5 μm, as measured by a 0.1 wt. % KBr disk method.

5. The process of claim 4 wherein the heat-resistant particles are made of a carbide or an oxide.

6. The process of claim 5 wherein the heat-resistant particles are made of silicon carbide or ilmenite.

7. The process of claim 1 wherein the hydrothermally treated boehmite shaped product is burned at a temperature of at least about 500° C. to obtain a burned boehmite shaped product.

8. The process of claim 7 wherein heat-resistant particles having a radiation energy absorptivity of at least 35% throughout the entire range of the wave-length of from about 2 to about 5 μm, as measured by a 0.1 wt. % KBr disk method.

9. The process of claim 8 wherein the heat-resistant particles are made of a carbide or an oxide.

10. The process of claim 9 wherein the heat-resistant particles are made of silicon carbide or ilmenite.

* * * * *